United States Patent [19]

Kmiec

[11] Patent Number: 5,718,974
[45] Date of Patent: Feb. 17, 1998

[54] CABLE JACKET

[75] Inventor: Chester J. Kmiec, Phillipsburg, N.J.

[73] Assignee: Union Carbide Chemicals & Plastics Technology Corporation, Danbury, Conn.

[21] Appl. No.: 669,603

[22] Filed: Jun. 24, 1996

[51] Int. Cl.⁶ .................................................. B32B 27/00
[52] U.S. Cl. .................. 428/383; 428/379; 428/401; 174/113 R; 174/120 SR; 174/110 PM
[58] Field of Search ............................... 428/383, 375, 428/379, 378, 401; 174/110 R, 110 SR, 110 PM, 120 SR, 113 R; 525/53, 320, 321

[56] References Cited

U.S. PATENT DOCUMENTS

| | | | |
|---|---|---|---|
| 4,812,505 | 3/1989 | Topcik | 524/377 |
| 5,047,468 | 9/1991 | Lee et al. | 525/53 |
| 5,246,783 | 9/1993 | Spenadel et al. | 428/461 |
| 5,503,914 | 4/1996 | Michie et al. | 428/220 |

*Primary Examiner*—Patrick Ryan
*Assistant Examiner*—J. M. Gray
*Attorney, Agent, or Firm*—Saul R Bresch

[57] ABSTRACT

A cable comprising one or more communications media or electrical conductors, or a core of two or more communications media or electrical conductors, each communications medium, electrical conductor, or core being surrounded by at least two layers, an inner insulating layer and an outer jacketing layer, is disclosed. The jacketing layer comprises an in situ blend of two copolymers of ethylene and one or more alpha-olefins having 3 to 12 carbon atoms. The blend has an Mw/Mn ratio in the range of about 8 to about 22; a melt index in the range of about 0.2 to about 3.5 grams per 10 minutes; a melt flow ratio in the range of about 55 to about 135; a molecular weight in the range of about 90,000 to about 250,000; and a density of at least 0.915 gram per cubic centimeter.

3 Claims, No Drawings

CABLE JACKET

TECHNICAL FIELD

This invention relates to a cable construction, particularly jacketing for telecommunications cables

BACKGROUND INFORMATION

Telecommunications cable jacketing was one of the first large scale uses of high pressure, low density polyethylene (HP-LDPE). The use of HP-LDPE as a telecommunications jacket has been declining, however, because of the superior end-use performance properties typically achieved with a newer technology material, i.e.,linear low density polyethylene (LLDPE). LLDPE features better low and high temperature performance, toughness, abrasion resistance, and environmental stress crack resistance. There has been continued growth in the market for LLDPE, particularly LLDPE made under mild operating conditions, typically at pressures of 100 to 300 psi and reaction temperatures of less than 100 degrees C. This low pressure process provides a broad range of LLDPE resins for wire and cable, blown film, cast film, injection molding, rotational molding, blow molding, pipe, and tubing applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. The majority of the LLDPE resins on the market today have a narrow molecular weight distribution; however, LLDPE resins with broad molecular weight distributions are more frequently utilized in wire and cable applications.

The predominant alpha-olefin comonomers in commercial use are 1-butene, 1-hexene, 4-methyl-1-pentene, and 1-octene. LLDPE resins designed for wire and cable type applications typically incorporate 1-hexene as the comonomer. The use of the 1-hexene comonomer produces resins with significant environmental stress crack resistance (ESCR) advantages relative to those of ethylene/1-butene copolymers. The LLDPE is used in wire and cable jacketing applications where its physical properties and installation characteristics make the material well suited for a broad spectrum of jacketing applications. LLDPE jacketing is generally applied to cables using standard extruders employing crosshead dies. The resulting jacket is characterized by superior deformation properties, abrasion resistance, impact properties, and cut-through resistance. These properties together with toughness are enhanced when the LLDPE is of high molecular weight. However, as the molecular weight of the LLDPE increases, the processability (extrudability) of the resin usually decreases.

Thus, the wire and cable industry is seeking cable jacketing based on a resin, which approaches the extrudability of HP-LDPE, i.e., it has better extrudability than LLDPE, and has improved properties over both HP-LDPE and LLDPE jacketing, particularly with respect to tensile strength, elongation, and low temperature brittleness, while retaining the advantageous properties of both.

DISCLOSURE OF THE INVENTION

An object of this invention, therefore, is to provide a cable, particularly for telecommunications, having a jacket, which is distinguished by high tensile strength, high elongation, and improved low temperature brittleness as compared with LLDPE while maintaining the other advantageous properties of LLDPE, and which is based on a more easily extrudable resin comparable to LLDPE. Other objects and advantages will become apparent hereinafter.

According to the present invention such a cable construction has been discovered. The cable comprises one or more communications media or electrical conductors, or a core of two or more communications media or electrical conductors, each communications medium, electrical conductor, or core being surrounded by at least two layers, an inner insulating layer and an outer jacketing layer, said jacketing layer comprising an in situ blend of two copolymers of ethylene and one or more alpha-olefins having 3 to 12 carbon atoms, said blend having an Mw/Mn ratio in the range of about 8 to about 22; a melt index in the range of about 0.2 to about 3.5 grams per 10 minutes; a melt flow ratio in the range of about 55 to about 135; a molecular weight in the range of about 90,000 to about 250,000; and a density of at least 0.915 gram per cubic centimeter.

DESCRIPTION OF THE PREFERRED EMBODIMENT(S)

As noted above, the cable comprises one or more communications media or electrical conductors, or a core of two or more communications media or electrical conductors, each communications medium, electrical conductor, or core being surrounded by at least an insulating layer and jacketing layer having a defined composition. Typically, the communications media are glass fibers used in fiber optics applications, and the electrical conductors are copper wires. In certain applications, these fibers or wires are twisted to form a core. In any case, the cable construction is conventional. Depending on the application, there can be a polymeric jacketing layer, of primary concern in this specification; a metallic protective layer; a wrap of various materials; a polymeric insulating layer; and/or a polymeric semiconductive layer containing a conductive carbon black, for example.

The in situ blend is produced in two staged reactors connected in series wherein a mixture of resin and catalyst precursor is transferred from the first reactor to the second reactor in which another copolymer is prepared and blends in situ with the copolymer from the first reactor. One of the copolymers is of relatively high molecular weight and the other copolymer is of relatively low molecular weight. The first reactor can be the high molecular weight reactor or the low molecular weight reactor, the second reactor being the opposite. The reactor is named according to the relative molecular weight of the polymer produced in the reactor.

The copolymers produced in each of the reactors are copolymers of ethylene and at least one alpha-olefin comonomer, preferably one or two alpha-olefin comonomers. The alpha-olefin comonomers can have 3 to 12 carbon atoms, and preferably have 4 to 8 carbon atoms, and can be, for example, propylene, 1-butene, 1-hexene, 4-methyl-1-pentene, and 1-octene.

Preferred comonomer combinations:

| high mol wt reactor | low mol wt reactor |
| --- | --- |
| 1-hexene | 1-hexene |
| 1-hexene | 1-butene |
| 1-butene | 1-butene |
| 1-butene | 1-hexene |

The 1-hexene/1-butene and the 1-butene/1-hexene combinations are found to give the best overall jacket properties.

It will be understood that generally the in situ blend can be characterized as a multimodal resin, usually bimodal or trimodal. In some cases, however, the two components making up the blend are sufficiently close in average molecular weight that there is no discernible discontinuity in the molecular weight curve.

The properties of these resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The in situ blending can be achieved by the processes described in U.S. Pat. Nos. 5,047,468 and 5,126,398. A typical catalyst system used in in situ blending is a magnesium/titanium based catalyst system, which can be exemplified by the catalyst system described in U.S. Pat. No. 4,302,565 although the precursor is preferably unsupported. Another preferred catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/aluminum mixtures, silica modified with organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5) Cl_3$, $Ti(OCOCH_3) Cl_3$, and $Ti(OCOC_6H_5) Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

As mentioned above, the relatively low melt index (or high molecular weight) copolymer can be prepared in the first reactor and the relatively high melt index copolymer in the second reactor. This can be referred to as the forward mode, and is preferred. Alternatively, the low molecular weight copolymer can be prepared in the first reactor and the high molecular weight copolymer in the second reactor. This can be referred to as the reverse mode.

The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer media.

In the high molecular weight reactor:

Because of the low values, instead of malt index, flow index is determined and those values are used in this specification. The flow index can be in the range of about 0.01 to about 30 grams per 10 minutes, and is preferably in the range of about 0.8 to about 12 grams per 10 minutes. The molecular weight of this polymer is, generally, in the range of about 135,000 to about 445,000. The density of the copolymer can be at least 0.860 gram per cubic centimeter, and is preferably in the range of 0.900 to 0.930 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 50 to about 3000 grams per 10 minutes, and is preferably in the range of about 50 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.955 gram per cubic centimeter. The melt flow ratio of this copolymer can be in the range of about 20 to about 70, and is preferably about 20 to about 45.

The in situ blend or final product, as removed from the second reactor, can have a melt index in the range of about 0.2 to about 3.5 grams per 10 minutes, and preferably has a melt index in the range of about 0.3 to about 2.0 grams per 10 minutes. The melt flow ratio can be in the range of about 55 to about 135. The molecular weight of the final product is, generally, in the range of about 90,000 to about 250,000. The density of the blend is at least 0.915 gram per cubic centimeter, and is preferably in the range of 0.916 to 0.930 gram per cubic centimeter.

The blend has a broad molecular weight distribution, which is reflected in an Mw/Mn ratio of about 8 to about 22, preferably about 9 to about 20. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.67:1 to about 1.5:1, and is preferably in the range of about 0.75:1 to about 1.33:1. The optimum weight ratio is about 1:1.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor:

The mole ratio of alpha-olefin to ethylene can be in the range of about 0.05:1 to about 0.4:1, and is preferably in the range of about 0.13:1 to about 0.26:1. The mole ratio of hydrogen (if used) to ethylene can be in the range of about 0.017:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

The mole ratio of alpha-olefin to ethylene can be in the range of about 0.1:1 to about 0.6:1, and is preferably in the range of about 0.2:1 to about 0.42:1. The mole ratio of hydrogen to ethylene can be in the range of about 1.0:1 to about 2.5:1, and is preferably in the range of about 1.7:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

The application of the resin composition on, for example, a glass fiber or copper wire is generally performed by extrusion. The extruder is usually a conventional one using a crosshead die, which provides the desired layer (wall or coating) thickness. An example of an extruder, which can be used, is the single screw type modified with a crosshead die, cooling trough, and continuous take-up equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160° to about 260° C., and is preferably carried out at temperatures in the range of about 180° to about 240° C. The crosshead die distributes the polymer melt in a flow channel such that the material exits with a uniform velocity. The typical jacketing polyethylene die is single tapered. The die land length is generally 3 to 20 millimeters. The single fiber, wire, or core passes through the center of the crosshead and as it exits the die a uniform layer is circumferentially applied using either pressure or tube-on tooling. Several layers can be applied using a multiple crosshead. The cable is then cooled in the water trough sufficiently to preclude deformation of the applied layer on the take-up reel. In a telecommunications cable, the jacketing layer thickness can be about 20 to about 100 mils with a preferred range of about 30 to about 80 mils.

Conventional additives, which can be introduced into the in situ blend, are exemplified by antioxidants, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, water tree growth retardants, voltage stabilizers, additional flame retardant additives, and smoke suppressants. Additives can be added in amounts ranging from about 0.01 to about 10 parts by weight for each 100 parts by weight of the base resin, in this case, the ethylene/unsaturated ester copolymer except for carbon black and fillers. Carbon black is often added in amounts up to 15 parts by weight. Fillers, other than flame retardants such as hydrated fillers, e.g., magnesium hydroxide or alumina trihydrate, can be added in amounts ranging from about 1 to about 50 parts by weight. The hydrated fillers can be added in amounts of about 50 to about 300 parts by weight per 100 parts by weight of resin.

Advantages of the invention, particularly in terms of telecommunications jacketing, include improved tensile and elongation properties over the conventional LLDPE jacket now utilized in the industry. Advantages in notched low temperature brittleness are also obtained. Processing advantages over the conventional LLDPE include lower head and breaker plate pressures; reduced extruder power amperage; reduced screw rpm at similar line speeds; and the allowance of higher line speeds without increasing extrusion pressures or extrusion power.

In the past, achievement of improved tensile strength and elongation results when higher molecular weight polyethylenes were used. This increase in molecular weight increased the melt viscosity resulting in higher extrusion pressures and drive power (motor amperage). Higher melt temperatures also occurred. Utilizing lower molecular weight polyethylenes resulted in decreased tensile properties and elongation. Extrusion pressures and extruder drive power decreased, however, with lower melt temperatures. Surprisingly, it is found that for this invention, improved tensile strength, elongation, and low temperature brittleness properties are achieved. A reduction in extrusion pressures and extruder drive motor amperage are also achieved without a reduction in wire line speed, but an increase in wire line speed and extruder screw speed can also be achieved without increasing extrusion pressure or motor amperage. These results are certainly unexpected.

Patents mentioned in this specification are incorporated by reference herein.

The invention is illustrated by the following examples.

EXAMPLES 1 TO 6

Examples 1 to 4 utilize CATALYST PRECURSOR A: A titanium trichloride catalyst precursor is prepared in a 1900 liter vessel equipped with pressure and temperature controls and a turbine agitator. A nitrogen atmosphere (less than 5 ppm $H_2O$) is maintained at all times.

1480 liters of anhydrous tetrahydrofuran (THF) containing less than 40 ppm $H_2O$ are added to the vessel. The THF is heated to a temperature of 50 degrees C., and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C. over a period of about three hours. The temperature is held at about 70 degrees C. by heating for approximately another four hours. At the end of this time, 61.7 kilograms of magnesium dichloride (540 mols) are added and heating is continued at 70 degrees C. for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C. throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 12 microns. The scrubber section of the spray dryer is maintained at approximately minus 4 degrees C..

Nitrogen gas is introduced into the spray dryer at an inlet temperature of 140 degrees C. and is circulated at a rate of approximately 1700 kilograms per hour. The catalyst slurry is fed to the spray dryer at a temperature of about 35 degrees C. and a rate of 90 to 95 kilograms per hour, or sufficient to yield an outlet gas temperature of approximately 100 degrees C. The atomization pressure is slightly above atmospheric. Discrete spray dried catalyst precursor particles are formed.

The spray dried catalyst contains 2.5 weight percent Ti, 6.3 weight percent Mg, and 29.2 weight percent THF. The particles have a D10 of 8 microns, a D50 of 12 microns, and a D90 of 18.6 microns as determined by means of a Leeds and Northrup Microtrac™ particle size analyzer using a dodecane solvent.

The discrete catalyst precursor particles are mixed with mineral oil under a nitrogen atmosphere in a 400 liter vessel equipped with a turbine agitator to form a slurry containing approximately 28 weight percent of the solid catalyst precursor. A 50 weight percent solution of tri-n-hexylaluminum in mineral oil is added and the slurry is stirred for one hour. The tri-n-hexylaluminnm solution is employed in an amount sufficient to provide 0.2 mol of tri-n-hexylaluminum per mol of THF in the catalyst. A 30 weight percent solution of diethylaluminum chloride (DEAC) in mineral off is then added and the mixture is stirred for another hour. The DEAC is employed in an amount sufficient to provide 0.45 mol of DEAC per mol of THF in the catalyst.

Example 5 utilizes CATALYST PRECURSOR B: A titanium trichloride catalyst precursor is prepared in a 600 liter vessel equipped with pressure and temperature controls, and a turbine agitator. A nitrogen atmosphere (less than 5 ppm $H_2O$) is maintained at all times.

460 liters of anhydrous THF (less than 40 ppm $H_2O$) are added to the vessel, followed by 18.7 kilograms of anhydrous (less than 100 ppm $H_2O$) magnesium dichloride (196 mols) and 7.67 kilograms of TiCl$_3$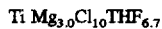⅓ AlCl$_3$ (3805 mols TiCl$_3$). The pressure of the mix tank is increased to 140 millimeters mercury and the mixture is agitated and heated at 80 degrees C. for 4 to 6 hours to dissolve the magnesium and titanium compounds. The mixture is filtered through a 100 micron filter to remove undissolved magnesium chloride(less than 40.5 weight percent).

500 grams of porous silica dehydrated to 600 degrees C., and optionally treated with 4 to 8 weight percent TEAL, are added to the above solution and stirred for 2 hours at 80 degrees C. and 1200 millimeters mercury. The mixture is dried by reducing pressure and allowing the excess THF to flash. The resulting catalyst precursor is a dry free flowing powder having the particle size of the silica. The adsorbed precursor has the following formula:

$$Ti\ Mg_{3.0}Cl_{10}THF_{6.7}$$

The desired weight of the above precursor is added to the mix tank with a sufficient amount of isopentane to provide a slurry system. A 20 weight percent solution of DEAC in isopentane is added to the mix tank. The DEAC is employed to provide 0.45 mol of DEAC per mol of THF in the precursor. The mixture is stirred for 30 minutes to let the DEAC react with the precursor. A 20 weight percent solution of tri-n-hexylaluminum in isopentane is added to the mix tank. The tri-n-hexylaluminum is employed in an amount sufficient to provide 0.20 mol of tri-n-hexylaluminum per mol of THF in the precursor. The mixture is stirred for 30 minutes to let the tri-n-hexylaluminum react with the precursor.

Once the slurry is thoroughly mixed, it is then dried under a dry nitrogen purge at a temperature of 70 degrees C. to remove the isopentane. The resulting precursor is impregnated into the pores of the silica. The precursor is a dry free flowing powder having the particle size of the silica.

Polyethylene is produced using the following standard procedure. With respect to reaction conditions, the example 1 variables are set forth in Table I; the example 2 variables are set forth in Table II; the example 3 variables are set forth in Table III, the example 4 variables are set forth in Table IV and the example 5 variables are set forth in Table V. In addition to the reaction conditions, the Tables set forth resin properties of the final product, i.e., the in situ blend.

Ethylene is copolymerized with 1-butene or 1-hexene. Triethylaluminum (TEAL) or trimethylaluminum (TMA) cocatalyst is added to each reactor during polymerization as a 5 or 10 weight percent solution in either hexane or isopentane. The pressure in each reactor is 300 psia. Each polymerization is continuously conducted after equilibrium is reached under the conditions set forth in the Tables.

Polymerization is initiated in the first reactor by continuously feeding the above catalyst precursors and cocatalyst into a fluidized bed of polyethylene granules together with ethylene, 1-hexene or 1-butene, and hydrogen. The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene or 1-butene, and hydrogen are introduced into the second reactor where they come into contact with the copolymer and catalyst from the first reactor. Additional cocatalyst is also introduced. The product blend is continuously removed.

The Tables follow:

TABLE I

Example 1

| reaction conditions | first reactor | second reactor | final product |
|---|---|---|---|
| temperature (°C.) | 70 | 85 | — |
| comonomer | 1-hexene | 1-butene | — |
| C2 partial pressure (psia) | 24 | 85 | — |
| H2/C2 molar ratio | 0.057 | 1.79 | — |
| comonomer/C2 molar ratio | 0.147 | 0.23 | — |
| catalyst feed (lbs/hr) | 19.6 | — | — |
| 10% TMA co-catalyst feed (lbs/hr) | 36 | 13 | — |
| production rate (lbs/hr) | 14,600 | 16,300 | — |
| bed weight (lbs) | 52,161 | 72,962 | — |
| residence time (hrs) | 3.57 | 2.36 | — |
| flow index (g/10 min) | 2.0 | — | 81.0 |
| melt index (g/10 min) | — | 300 | 0.75 |
| density (g/cc) | 0.909 | 0.934 | 0.922 |
| melt flow ratio | — | 22 | 109 |
| residual titanium (ppm) | 7.81 | 3.83 | — |
| settled bulk density (lbs/cu ft) | 12.4 | 17.0 | — |
| average particle size (inch) | 0.025 | 0.023 | — |
| Mw/Mn | — | — | 12.5 |

TABLE II

Example 2

| reaction conditions | first reactor | second reactor | final product |
|---|---|---|---|
| temperature (°C.) | 85 | 72 | — |
| comonomer | 1-butene | 1-hexene | — |
| C2 partial pressure (psia) | 66.7 | 53 | — |
| H2/C2 molar ratio | 1.96 | 0.018 | — |
| comonomer/C2 molar ratio | 0.28 | 0.166 | — |
| catalyst feed (lbs/hr) | 8.87 | — | — |
| 10% TMA co-catalyst feed (lbs/hr) | — | — | — |
| production rate (lbs/hr) | 16,072 | 12,725 | — |
| bed weight (lbs) | 62,210 | 60,225 | — |
| residence time (hrs) | 3.87 | 2.09 | — |
| flow index (g/10 min.) | — | 1.25 | 64.4 |
| melt index (g/10 min.) | 274 | — | 0.59 |
| density (g/cc) | 0.931 | 0.906 | 0.920 |
| melt flow ratio | — | — | 109 |
| residual titanium (ppm) | 4.23 | 2.5 | — |
| settled bulk density (lbs/cu ft) | 25.9 | 24 | — |
| average particle size (inch) | 0.016 | 0.015 | — |
| Mw/Mn | — | — | 13.7 |

TABLE III

Example 3

| reaction conditions | first reactor | second reactor | final product |
|---|---|---|---|
| temperature (°C.) | 85 | 80 | — |
| comonomer | 1-butene | 1-hexene | — |
| C2 partial pressure (psia) | 67.2 | 57 | — |
| H2/C2 molar ratio | 1.96 | 0.021 | — |
| comonomer/C2 molar ratio | 0.294 | 0.149 | — |
| catalyst feed (lbs/hr) | 6.95 | — | — |
| 10% TMA co-catalyst feed (lbs/hr) | — | — | — |
| production rate (lbs/hr) | 15,222 | 12,347 | — |
| bed weight (lbs) | 60,225 | 58,815 | — |
| residence time (hrs) | 3.96 | 2.13 | — |
| flow index (g/10 min.) | — | 2.08 | 83.3 |
| melt index (g/10 min.) | 307 | — | 0.93 |
| density (g/cc) | 0.930 | 0.910 | 0.920 |
| melt flow ratio | — | — | 89 |
| residual titanium (ppm) | 3.17 | 2.01 | — |
| settled bulk density (lbs/cu ft) | 24.5 | 22.6 | — |
| average particle size (inch) | 0.017 | 0.019 | — |
| Mw/Mn | — | — | 13.4 |

TABALE IV

Example 4

| reaction conditions | first reactor | second reactor | final product |
|---|---|---|---|
| temperature (°C.) | 70 | 85 | — |
| comonomer | 1-hexene | 1-butene | — |
| C2 partial pressure (psia) | 34 | 67 | — |
| H2/C2 molar ratio | 0.074 | 2.01 | — |
| comonomer/C2 molar ratio | 0.14 | 0.37 | — |
| catalyst feed (cc/hr) | 13.75 | — | — |
| 10% TMA co-catalyst feed rate (cc/hr) | 220 | 220 | — |
| production rate (lbs/hr) | 30 | 27 | — |
| bed weight (lbs) | 89 | 118 | — |
| residence time (hrs) | 2.97 | 2.07 | — |
| flow index | 2.32 | — | 83.1 |

TABLE IV-continued

Example 4

| reaction conditions | first reactor | second reactor | final product |
|---|---|---|---|
| (g/10 min.) melt index | — | 300 | 0.74 |
| (g/10 min.) density (g/cc) | 0.910 | 0.931 | 0.920 |
| melt flow ratio | — | 22 | 112 |
| residual titanium (ppm) | 3.96 | 2.94 | — |
| settled bulk density (lbs/cu ft) | 21.0 | 22.5 | — |
| average particle size (inch) | 0.027 | 0.029 | — |

TABLE V

Example 5

| reaction conditions | first reactor | second reactor | final product |
|---|---|---|---|
| temperature (°C.) | 85 | 85 | — |
| comonomer | 1-butene | 1-hexene | — |
| C2 partial pressure (psia) | 79 | 68 | — |
| H2/C2 molar ratio | 2 | 0.025 | — |
| comonomer/C2 molar ratio | 0.34 | 0.185 | — |
| catalyst feed (cc/hr) | 300 | — | — |
| 5% TEAL feed rate (cc/hr) | 150 | 150 | — |
| production rate (lbs/hr) | — | — | — |
| bed weight (lbs) | 85 | 120 | — |
| flow index (g/10 min.) | — | 3.27 | 85 |
| melt index (g/10 min.) | 450 | — | 0.72 |
| density (g/cc) | 0.930 | 0.912 | 0.921 |
| melt flow ratio | — | — | 120 |
| residual titanium (ppm) | 3.8 | 1.9 | — |
| settled bulk density (lbs/cu ft) | — | — | — |
| average particle size (inch) | 0.017 | 0.018 | — |

Notes to Tables I to V:
1. Resin properties for the second reactor: These are theoretical values based on the assumption that the second reactor copolymer is produced independently.
2. Density is measured by producing a plaque in accordance with ASTM D-1928, procedure C, and then testing as is via ASTM D-1505.
3. Melt flow ratio is the ratio of flow index to melt index.
4. The molecular weight distribution is performed via Size Exclusion Chromatography using a WATERS ™ chromatograph with trichlorobenzene as solvent at 140 degrees C. with a broad molecular weight distribution standard and broad molecular weight distribution calibration method.

The resin blends described in Examples 1 to 5 are prepared into jacket compositions using the standard test formulation illustrated in Table VI. Each composition is prepared via a BANBURY™ mixer and pelletized into one eighth inch pellets. Following this preparation procedure, Example 6, a control formulation using a conventional LLDPE, is prepared, said LLDPE being made from a conventional low pressure process with a melt index of 0.65 gram per 10 minutes and a density of 0.920 gram per cubic centimeter. A conventional low pressure process for LLDPE is described in U.S. Pat. No. 4,482,687.

TABLE VI

Standard Test Formulation (in percent by weight)

| Base polyethylene resin | 92.21 |
|---|---|
| Carbon Black Masterbatch | 7.50 |
| Antioxidant I | 0.20 |
| Antioxidant II | 0.07 |
| Fluoropolymer processing aid | 0.02 |
| Total | 100 percent |

Notes to Table VI:
1) Carbon black masterbatch contains 35 percent furnace black; 0.2 percent Antioxidant III; and 65 percent LLDPE having a melt index of 0.65 gram per 10 minutes and a density of 0.920 gram per cubic centimeter.
2) Antioxidant I is polymerized 2,2,4-trimethyl-1,2-dihydroquinoline.
3) Antioxidant II is thiodiethylene-bis(3,5-di-tert-butyl-4-hydroxy)-hydrocinnamate.
4) Antioxidant III is 4,4'-thio bis(6-t-butyl-3-methylphenol).

Examples 1 to 6 are extruded onto 14 AWG (64 mils) copper wire with a targeted jacket thickness of 30 mils. Note that the final overall wire diameter is 124 mils. The equipment utilized is a DAVIS™ standard wire line equipped with a 2.5 inch extruder, a 0.090 inch polyethylene metering screw, a 0.125 inch die, a 0.65 inch tip and a 20/40/60/20 screen pack. Table VII exemplifies the results obtained from the extrusion process.

TABLE VII

Extrusion Parameters

| Example | 1 | 2 | 3 | 4 | 5 | 6 |
|---|---|---|---|---|---|---|
| Temperature Profile Setpoint (°F.) | | | Actual temperature (°F.) | | | |
| Zone 1   347 | 348 | 348 | 348 | 348 | 348 | 349 |
| Zone 2   374 | 376 | 375 | 375 | 375 | 376 | 375 |
| Zone 3   392 | 398 | 399 | 399 | 399 | 400 | 400 |
| Zone 4   401 | 406 | 407 | 407 | 407 | 407 | 407 |
| Zone 5   419 | 422 | 423 | 423 | 423 | 423 | 424 |
| Head     419 | 331 | 345 | 346 | 343 | 339 | 332 |
| Die      419 | 425 | 425 | 425 | 425 | 425 | 425 |
| Melt      — | 419 | 411 | 410 | 410 | 409 | 407 |
| Pressures (psi) | | | | | | |
| Zone 5 | 3600 | 3800 | 3800 | 3700 | 3800 | 4400 |
| Breaker Plate | 3150 | 3430 | 3290 | 3290 | 3420 | 3840 |
| Head | 2600 | 2700 | 2700 | 2600 | 2700 | 3100 |
| Screw (rpm) | 35 | 35 | 35 | 35 | 35 | 37.5 |
| Screw amps | 35 | 35 | 36 | 35 | 35 | 40 |
| Linespeed (fpm) | 200 | 199 | 197 | 199 | 199 | 203 |
| Cable surface | smooth | smooth | smooth | smooth | smooth | smooth |

Table VII illustrates the unexpected extrusion performance of the in situ blends as compared to the LLDPE control example. Significantly lower extrusion pressures are obtained with the in situ blends at both the breaker plate and head. In conjunction, reduced motor amperage results in equivalent linespeed to the LLDPE control The incorporation of high molecular weight polymer into the blend does not result in more difficult extrusion processing as would have been expected by those skilled in the art. Further advantages result when example 1 is extruded at equivalent pressures to the example 6 control. The result is that higher line speeds are obtained with the in situ blends as noted in Table VIII under extrusion processing conditions similar to those used for a conventional LLDPE jacket. Extruding the control at 380 fpm (feet per minute) results in increasing extrusion pressures as well as a rough jacket surface caused by melt fracture. This fracture is not evident at the higher line speeds with the in situ blends even up to 490 fpm.

TABLE VIII

Extrusion Parameters

| | Example 1 Actual temperature (°F.) | Example 6 Actual temperature (°F.) |
|---|---|---|
| Temperature Profile Setpoint (°F.) | | |
| Zone 1  347 | 347 | 349 |
| Zone 2  374 | 377 | 375 |
| Zone 3  392 | 399 | 400 |
| Zone 4  401 | 408 | 407 |
| Zone 5  419 | 422 | 424 |
| Head  419 | 336 | 332 |
| Die  419 | 424 | 425 |
| Melt  — | 420 | 407 |
| Pressures (psi) | | |
| Zone 5 | 4300 | 4400 |
| Breaker Plate | 3710 | 3840 |
| Head | 3000 | 3100 |
| Screw (rpm) | 68 | 37.5 |
| Screw amps | 47 | 40 |
| Linespeed (fpm) | 380 | 203 |
| Cable surface | smooth | smooth |

The following Table IX lists the physical property characteristics of the formulations evaluated.

TABLE IX

| Example | 1 | 2 | 3 | 4 | 5 | 6 |
|---|---|---|---|---|---|---|
| Density (g/cc) | 0.937 | 0.937 | 0.933 | 0.934 | 0.937 | 0.937 |
| MI (dg/min) | 0.67 | 0.55 | 1.0 | 0.8 | 0.64 | 0.55 |
| FI (dg/min) | 80.3 | 62.4 | 109 | 96.7 | 83.5 | 54.1 |
| MFR | 119.4 | 113.5 | 107 | 121 | 130 | 98.3 |
| Tensile at Break (psi) | 4062 | 3435 | 4079 | 2850 | 3604 | 2555 |
| Elongation (%) | 869 | 780 | 886 | 960 | 930 | 683 |
| ESCR | 7 days no failure | 7 days no failure | 7 days no failure | 7 days no failure | 7 days no failure | 7 days no failure |
| Dielectric Constant | 2.57 | 2.53 | 2.53 | 2.54 | 2.56 | 2.54 |
| Dissipation Factor (times $10^{-3}$) | 0.607 | 0.346 | 0.528 | 0.438 | 0.424 | 0.329 |
| LTB F50 Notched (°C.) | minus 49 | minus 49 | — | — | — | minus 39 |

Notes to Table IX:
1) Density measured in accordance with ASTM D-1505
2) Melt Index measured in accordance with ASTM D-1238, Condition E
3) Flow Index measured in accordance with ASTM D-1238, Condition F
4) Melt Flow ratio is the ratio of flow index to melt index
5) Tensile Strength measure in accordance with ASTM D-638 at 2 inches per minute..
6) Elongation measured in accordance with ASTM D-638
7) ESCR, 10% "Igepal" Reagent, Fo measured in accordance with ASTM D-1693.
8) Dielectric Constant measured in accordance with ASTM D-1531
9) Dissipation Factor measured in accordance with ASTM D-1531
10) Notched Brittleness Temperature in accordance with a modified ASTM-D-746.

Table IX illustrates the significantly higher tensile strength and elongation values achieved with the in situ blends versus the control. In addition, improved low temperature brittleness properties of the polymer blends over the control is shown. No reduction in ESCR characteristics are noted even though 1-butene is present in the in situ blend.

I claim:

1. A cable comprising one or more communications media or a core of two or more communications media, each communications medium or core being surrounded by at least two layers, an inner insulating layer and an outer jacketing layer wherein the jacketing layer has a thickness in the range of about 20 to about 100 mils, said jacketing layer comprising an in situ blend of two copolymers of ethylene and one or more alpha-olefins having 3 to 12 carbon atoms, said blend having an Mw/Mn ratio in the range of about 8 to about 22; a melt index in the range of about 0.2 to about 3.5 grams per 10 minutes; a melt flow ratio in the range of about 55 to about 135; a molecular weight in the range of about 90,000 to about 250,000; and a density of at least 0.915 gram per cubic centimeter.

2. The cable defined in claim 1 wherein the jacketing layer has a thickness in the range of about 30 to about 80 mils and the blend has a melt index in the range of about 0.3 to about 2.0 grams per 10 minutes; a melt flow ratio in the range of about 55 to about 135; and a density in the range of 0.916 to 0.940 gram per cubic centimeter.

3. The cable defined in claim 2 wherein the blend has an Mw/Mn ratio in the range of about 9 to about 20.

* * * * *